United States Patent [19]

Fogal, Sr.

[11] Patent Number: 4,918,976

[45] Date of Patent: Apr. 24, 1990

[54] METHOD OF INSPECTING TIRES FOR DEFECTS

[75] Inventor: Robert D. Fogal, Sr., Chambersburg, Pa.

[73] Assignee: International Marketing, Inc., Chambersburg, Pa.

[21] Appl. No.: 383,122

[22] Filed: Jul. 21, 1989

Related U.S. Application Data

[63] Continuation-in-part of Ser. No. 337,215, Apr. 12, 1989.

[51] Int. Cl.⁵ ............... G01M 3/04; G01M 17/02
[52] U.S. Cl. ........................... 73/40.7; 73/49; 73/146
[58] Field of Search ............... 73/146, 40.7, 49; 252/964

[56] References Cited

U.S. PATENT DOCUMENTS 4,693,118  9/1987  Roberts ................. 73/40.7

Primary Examiner—Donald O. Woodiel
Attorney, Agent, or Firm—Diller, Ramik & Wight

[57] ABSTRACT

A method of inspecting a tire for defects by applying to an interior surface of a tire a coating of material which accentuates defects when influenced by predetermined electromagnetic wavelengths, road-running the tire to thereby create tread wear, buffing the exterior tread surface of the tire, and applying predetermined electromagnetic wavelengths to the exterior of the buffed tread surface whereby coating material which has migrated through a defect in the tire to the exterior is accentuated and thereby readily detected. Preferably the coating material fluoresces or brightens when subjected to ultraviolet light. The coating material is preferably part of an admixture composed of the ultraviolet light accentuating coating material and a tire sealant which seals punctures, nail holes and the like when the same migrates through the tire.

34 Claims, 5 Drawing Sheets

METHOD OF INSPECTING TIRES FOR DEFECTS

CROSS-REFERENCE TO RELATED APPLICATIONS

This application is a continuation-in-part application of application Ser. No. 07/337,215 in the name of Hobert D. Fogal filed Apr. 12, 1989, entitled A Method of Inspecting Tires for Defects.

BACKGROUND OF THE INVENTION

The invention is directed to a method of inspecting tires prior to recapping. If an casing which has defects is recapped because the defects were not detected before recapping, various disadvantages occur. Pressurized air in the tire can migrate through the defect, form a pocket between the outer surface of the casing and the new rubber, and at a minimum a bulge is created which produces erratic handling/steering, misalignment problems, vibration, etc. At times the air pressure which builds up between the casing and the new rubber simply blows the old rubber from the casing, and this can be particularly hazardous if it occurs in transit at high speeds Even if a defect is discovered after a tire has been recapped, this tire cannot be placed on a vehicle because of the danger involved, and obviously the tire must be discarded with the recapper absorbing the cost of labor and materials involved in the recapping operation.

Heretofore defects in tires, such as nail holes and punctures, but including patches and splices, were generally found by either extremely expensive sophisticated detection machinery or laborious time consuming manual sight inspection by a person merely shining a light into the interior of a spread tire and looking for defects.

SUMMARY OF THE INVENTION

In keeping with foregoing, this invention is directed to a novel method of locating defects in tires prior to recapping in the absence of extremely costly equipment while at the same time providing rapid and highly efficient manual inspection. In keeping with the method, a tire which is to be retreaded or recapped is placed upon an expandable mandrel and a liquid material which accentuates defects when influenced by predetermined electromagnetic wavelengths is introduced into the interior of the tire. The expandable mandrel or hub is expanded and the interior of the tire is pressurized after which the hub and therefore the tire are rotated. During this rotation the material is uniformly applied over the entire interior surface of the tire and due to the internal pressure, the liquid is forced to migrate through any of even the most minute defects toward and to the tire exterior. As the tire continues to rotate relatively slowly light of the predetermined electromagnetic wavelengths corresponding to those which influence the coating material is applied to the exterior surface of the coated tire whereby any coating material which has migrated through a defect in the tire to the exterior is accentuated and thus is readily detected. A workman need not look into the tire interior, as is now conventional, and once defects visible on the exterior surface have been detected, the defects can be repaired, if possible, or the tire discarded and not recapped thereby saving corresponding time, labor, effort, materials and money.

Preferably the liquid material is rendered fluorescent or brightened under the influence of ultraviolet rays (black light).

In further accordance with the invention the liquid coating material is also preferably an admixture which includes a detergent, and during the rotation of the tire earlier described, the detergent totally cleanses the tire interior such that upon the removal of excess of the admixture from the tire interior and the removal of the tire from the hub, a workman can quickly spread the tire and subject the interior to ultraviolet light to quickly check for large interior damage, such as patches and splices to make certain, for example, that a splice is not beginning to split which might not be determined from only an exterior inspection as heretofore described. However, before the interior inspection is made, the tire while still under pressure and carried by the expanded hub is immersed in a tank containing the admixed liquid. The tire sidewalls are engaged by rotating brushes in the tank which thoroughly clean the exterior sidewalls and, of course, coat the same with the coating material. Thus the detergent totally cleanses the exterior sidewalls so that after the recapping operation the conventional paint applied thereto will adhere to the relatively clean exterior surface. However, even prior to recapping, when the workman is checking the tire interior for large internal defects, such as the patches and splices heretofore noted, he can also quickly check the tire exterior by utilizing the ultraviolet light to ascertain the presence or absence of exterior defects, such as external bruises, slashes and cuts, which may not penetrate into the tire interior and thus are not detectable by the coating material migration from the interior to the exterior of the tire heretofore described.

Thus in a matter of approximately two (2) minutes a worker can mount the tire on the mandrel, expand the mandrel, inject the liquid in the tire, rotate the tire and inspect the exterior for the migrated coating material and hence, defects, whereas under present day manual inspection, a workman could spend anywhere up to five minutes inspecting a tire interior for defects. Furthermore, in an additional minute to a minute and one half, a tire can be externally coated and cleaned, excess material drained, and the tire internally and externally again spot checked for large defects. Accordingly, the method is not only appreciably faster and more cost efficient than that conventionally provided in the industry, but the efficiency from the standpoint of percentage of defects detected is extremely high, thus resulting in a relatively negligible percentage of recapped tires having defects.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

A novel method of this invention will be described sequentially relative to FIGS. 1–7 of the drawings, and in each of which is illustrated a conventional automobile or truck tire T having sidewalls S1, S2 and respective beads B1, B2. The tire T includes an exterior surface E, an interior surface S, and the interior surface S defines a conventional tire interior or chamber I of a generally annular configuration.

Figure 1:
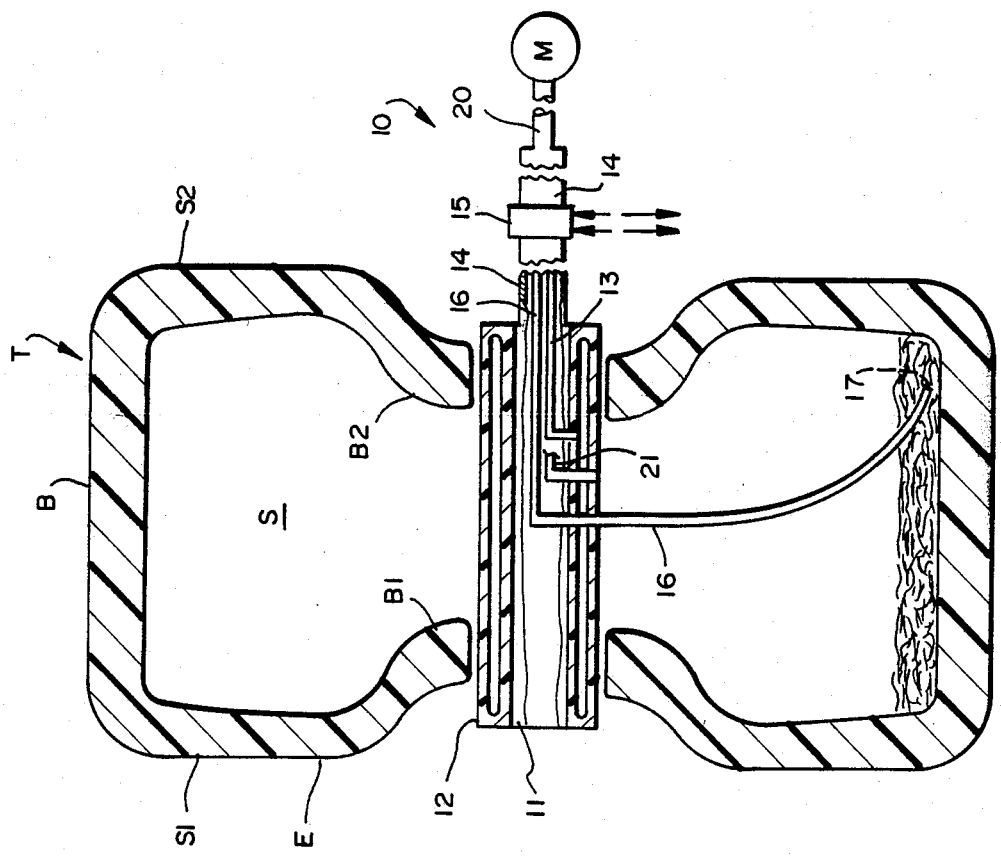
FIG. 1 is fragmentary schematic view taken through the axis of a tire and an expandable mandrel carried by a rotatable shaft and illustrates the initial step of the process.
Figure 5:
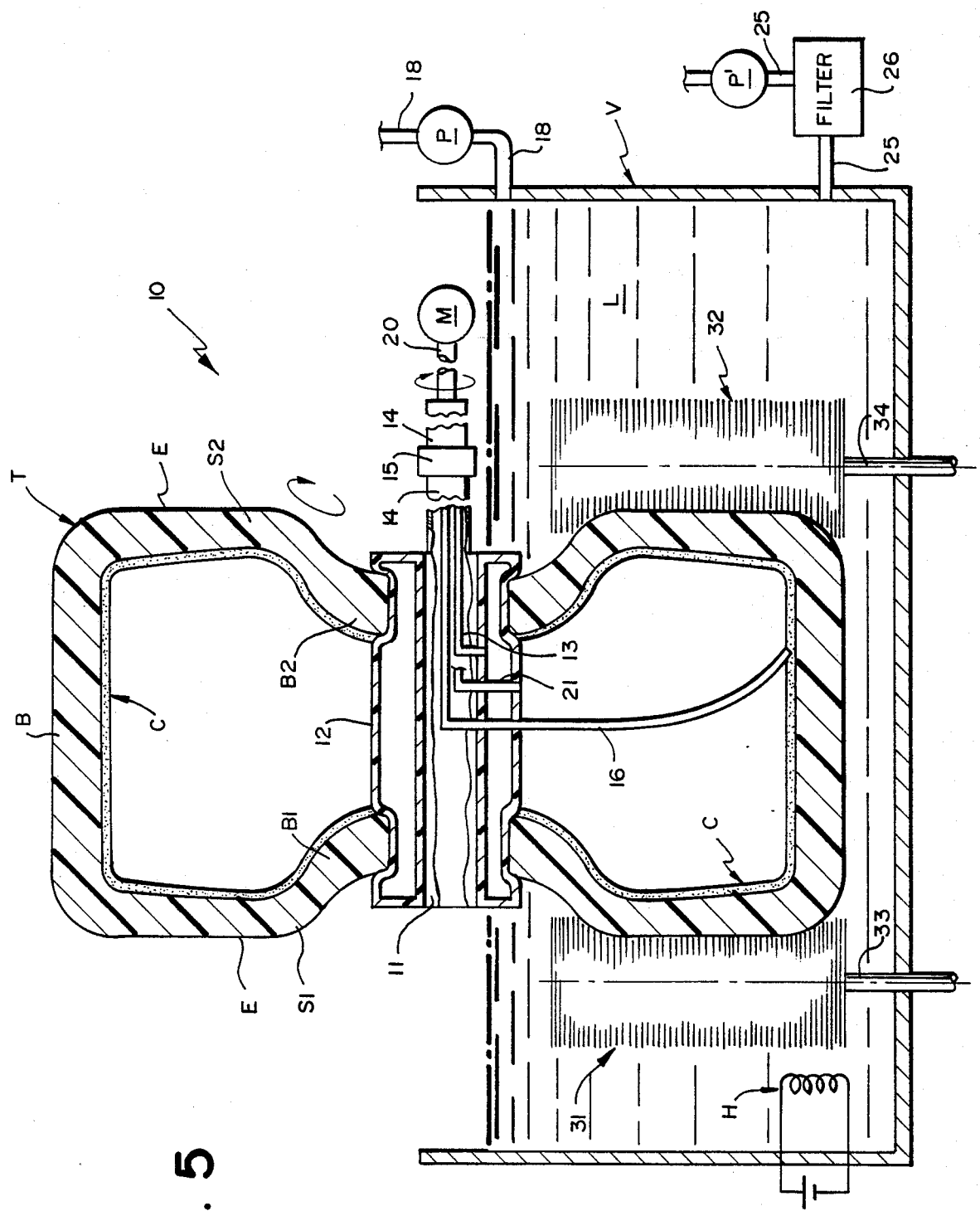
FIG. 5 is a fragmentary schematic view similar to FIG. 4, and illustrates the tire partially immersed in the coating material which also includes a detergent in an associated tank and associated brushes for cleaning the exterior sidewalls of the tire.

A mechanism or apparatus 10 of this invention includes a hollow, cylindrical, tubular mandrel 11 surrounded by and carrying a relatively flat tubular expandable hub 12 formed of rubber material. A flexible air pipe or tube 13 opens into the interior of the expandable hub, runs through a tubular shaft 14 and is connected through a rotatable coupling 15 to an exterior source of pressurized air (not shown) such as an air pump. Another flexible pipe or tube 16 passes completely through the expandable hub 12 and has an outlet 17 directed toward and opening into the interior I of the tire T when the tire T is positioned loosely upon the expandable hub 12, as shown in FIG. 1. The flexible pipe 16 is also connected through the rotatable coupling 15 to a liquid admixture L (FIG. 5) housed in a tank or vessel V (FIG. 5). A flexible pipe 18 runs between the coupling 15 and an upper portion (unnumbered) of the tank V and includes a pump P (FIG. 5) which can be conventionally manually energized and deenergized. The shaft 14 also includes a reduced drive end 20 connected to a motor M which also can be manually selectively energized or deenergized.

The liquid L in the tank V is an admixture of a liquid which accentuates defects when influenced by predetermined electromagnetic wavelengths and a detergent. The liquid of the admixture L which accentuates the defects of the tire T when influenced by electromagnetic wavelengths is preferably a fluorescent whitening agent, such as Uvitex OB or an optical brightener, such as Tinopal SFp, both products of Ciba-Geigy Corporation of 3 Skyline Drive, Hawthorne, N.Y. 10532. Both of these products generate brilliant bluish-white effects when subjected to and viewed under the influence of predetermined electromagnetic wavelengths, namely, ultraviolet light (black light).

The interior surface S of the tire T is thoroughly vacuumed clean before the tire is positioned generally in coaxial relationship to the expandable hub 12, as shown in FIG. 1.

Figure 2:
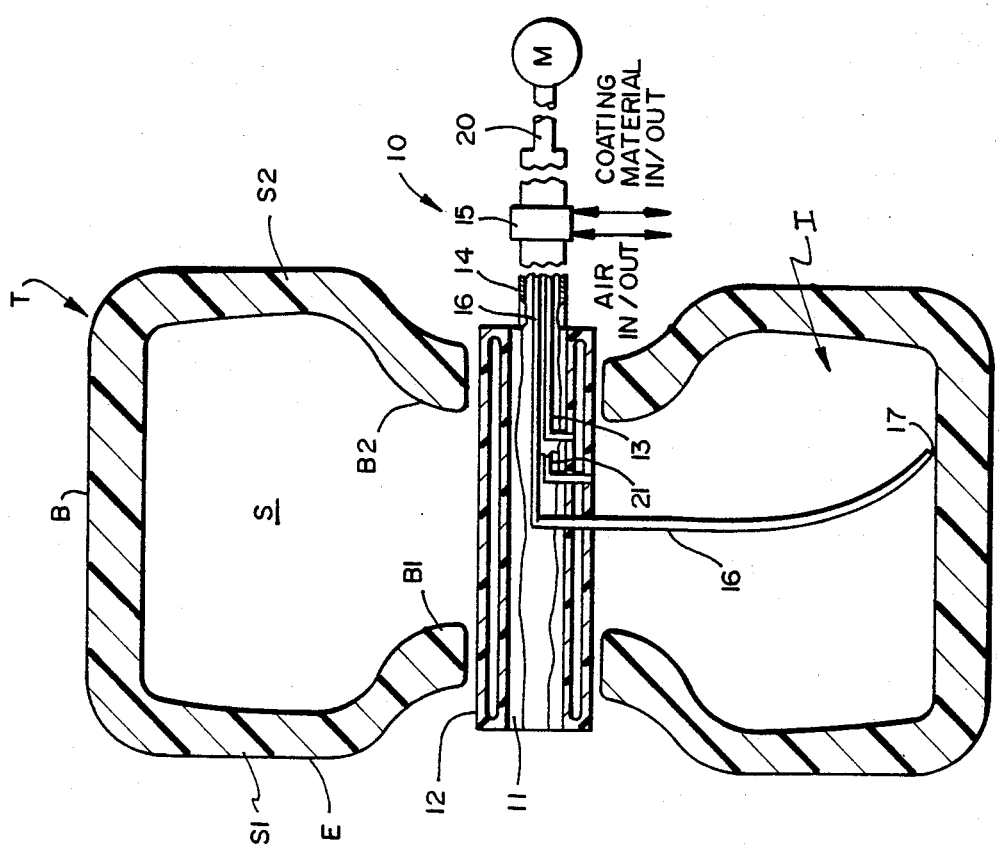
FIG. 2 is a fragmentary schematic view similar to FIG. 1 and illustrates coating material being injected into the tire interior just prior to or simultaneously with the expansion of the expandable hub.
Figure 4:
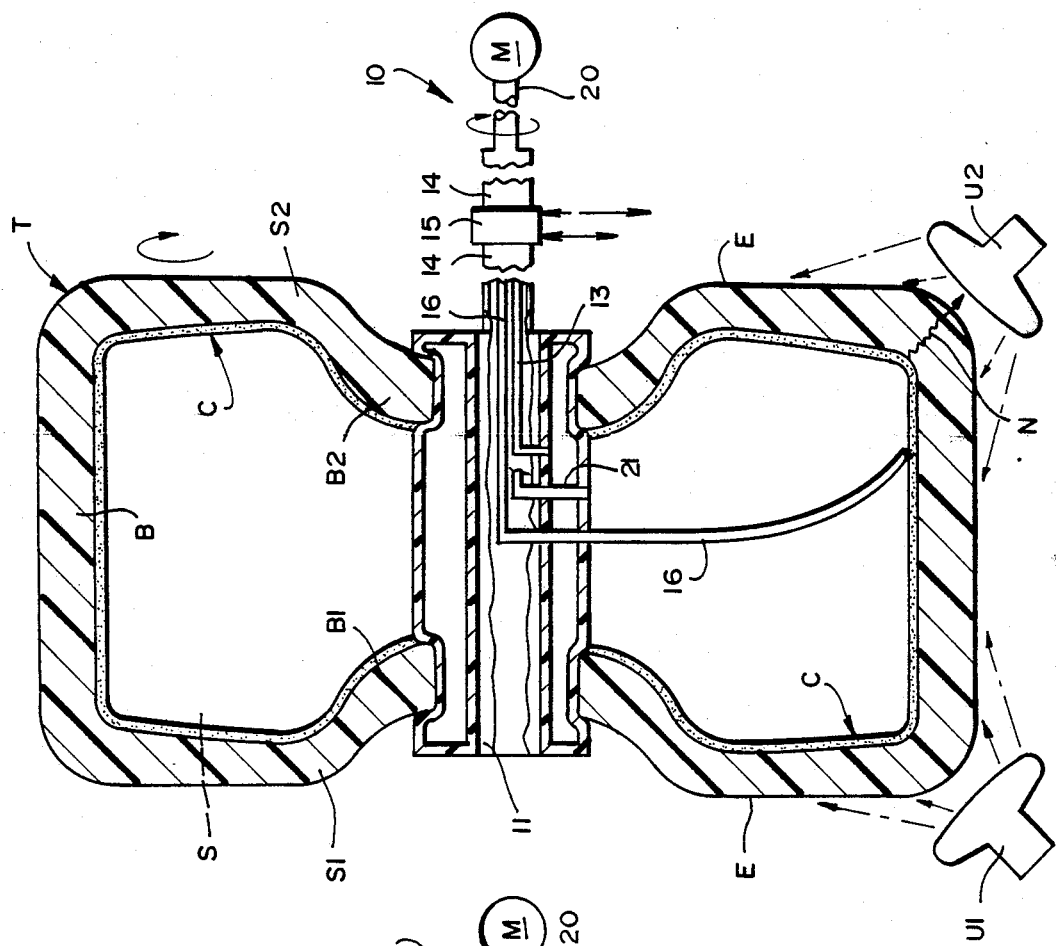
FIG. 4 is a fragmentary schematic view similar to FIG. 3 and illustrates the coating material uniformly applied to the interior surface of the tire while under pressure to augment the migration of the coating material to the tire exterior, and lights for emitting electromagnetic wavelengths which accentuate (fluoresce or brighten) the migrated coating material at the tire exterior surface.
Figure 3:
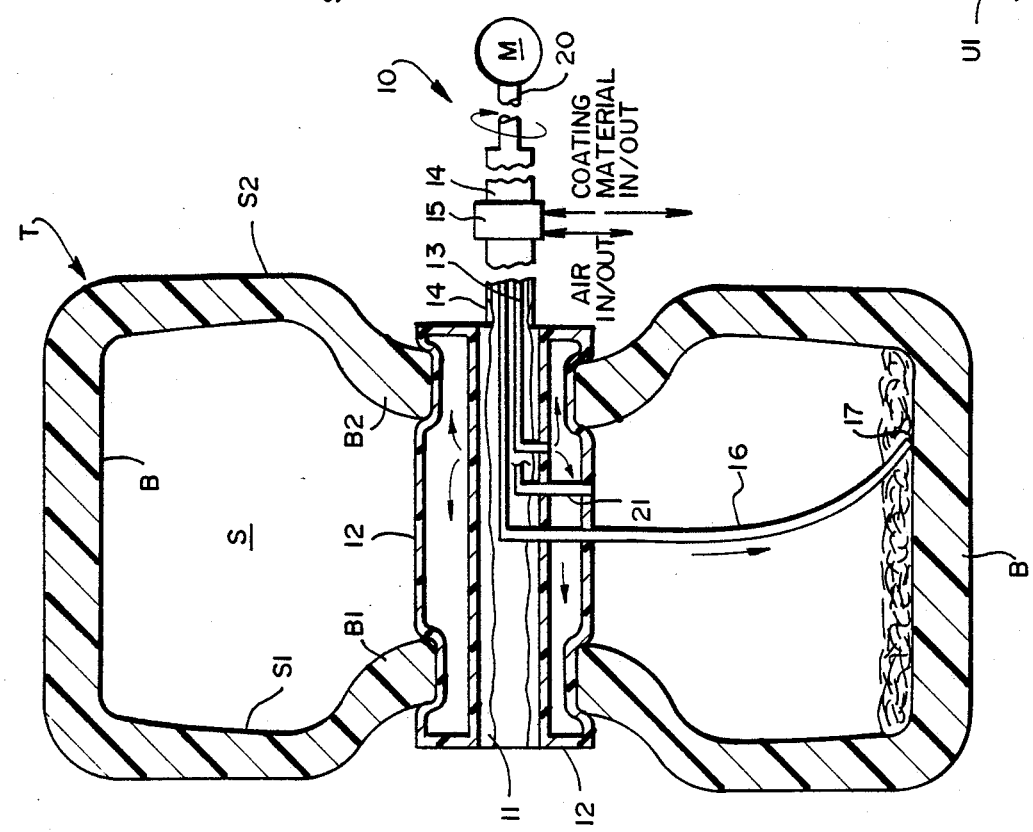
FIG. 3 is a fragmentary schematic view similar to FIG. 2, and illustrates the expandable hub in its expanded condition and the coating material incident to the rotation of the shaft which in turn rotates the hub and the tire to apply the coating material uniformly on the tire interior surface.

After the tire T has been positioned upon the expandable hub 12 the pump P (FIG. 5) is energized and the liquid admixture or coating material L is pumped by the pump P through the flexible pipe 18 into the coupling 15 and through the flexible pipe 16 into the interior I of the tire T through the opening 17, as is diagrammatically illustrated in FIG. 2. The liquid L preferably is heated by a heater H in tank V to a temperature of approximately 160° F. before it is pumped into the tire T. Approximately three gallons of the liquid admixture or coating material L is pumped into the tire T which, if the tire T is not rotating, will accumulate along the bottom portion of the tire T, as shown in FIG. 2. However, in keeping with the present invention, the expandable hub 12 can be inflated to its expanded position (FIG. 3) by air being introduced through the coupling 15 and the flexible pipe 13 into the expandable hub 12 prior to or simultaneously with the introduction of the coating material L into the tire interior I through the opening 17. Furthermore, as soon as the expandable hub 12 has expanded by the air introduced therein, as shown in FIG. 3, the motor M is energized to rotate the drive shaft 20, the shaft 14, the metallic mandrel 11, the now-expanded expandable hub 12 and the tire T, as indicated by the unnumbered headed arrow in FIG. 3 associated with the drive shaft 20. Obviously if the motor M is energized simultaneously with the introduction of the coating material L into the interior I of the tire T through the opening 17, the material L will not accumulate in the bottom portion of the tire T, as shown in FIGS. 2 and 3, but will be progressively applied over the entire interior surface S by the rotation of the tire, the liquid nature of the coating material L and the relatively low centrifugal force (three revolutions per minute). The interior I of the tire is also pressurized preferably between 7 psi–10 psi, but anywhere between 2 psi to 120 psi has been found appropriate. This internal pressurization of the interior I is achieved by another flexible air pipe 21 which runs from the external air pressure source (pump, not shown) through the coupling 15, the tubular shaft 14, and through the annular expandable hub 12, as is best illustrated in FIG. 4. Thus, the same air source can be used to inflate the expandable hub 12 via the flexible pipe 13 and, through a suitable check valve, the flexible pipe 21 can pressurize the interior of the tire T.

Under the relatively slow rotation of the tire T, as shown in FIG. 4, the coating material L which is deposited in the tire interior I is applied as a uniform coating C (FIG. 4) to the interior surface S of the tire T. Should the tire T have minor defects, such as pin holes, nail holes, thorn holes or the like between the surfaces S, E, the coating material C migrates therethrough, particularly as augmented or forced outwardly by the relatively low though constant 7 psi–10 psi pressure within the tire interior I. One such defect in the form of a pin hole or nail hole N is shown in FIG. 4, and as is also shown in FIG. 4, both sidewalls S1, S2 are subject to predetermined electromagnetic wavelengths from ultraviolet lamps U1, U2. Each of the ultraviolet lamps U1, U2 are preferably Model SPR 100 "Supercharger" manufactured by Spectronics Corporation of Westbury, N.Y., which operate at 115 v., 60 Hz, 30 AMpS and 365 hm. When the extremely minute "spot" of the coating material L which has migrated to the exterior E of the tire T through the defect N is influenced by the rays (unnumbered) emitted from the ultraviolet lights U1, U2, the small "dot" or "spot" fluoresces or brightens in a brilliant white/bluish-white color which is readily visible against the black exterior surface E, thus rendering the defect N readily detected by a workman. If the defect N can be repaired, the exterior E is simply marked for future repair as, for example, by conventional "plugging." Obviously both sidewalls S1, S2 are inspected. At approximately 20 rpms rotation of the shaft 20 and thus the tire T, a workman can thoroughly inspect each sidewall in twenty seconds, for example, and the tread B in another twenty seconds. Accordingly, in two or three minutes the entire process just described can be completed (FIGS. 1–FIG. 4), but more importantly, an extremely high rate of defect detection is achieved, as opposed to both the conventional sophisticated high-tech machinery and manual inspection heretofore noted.

Figure 6:
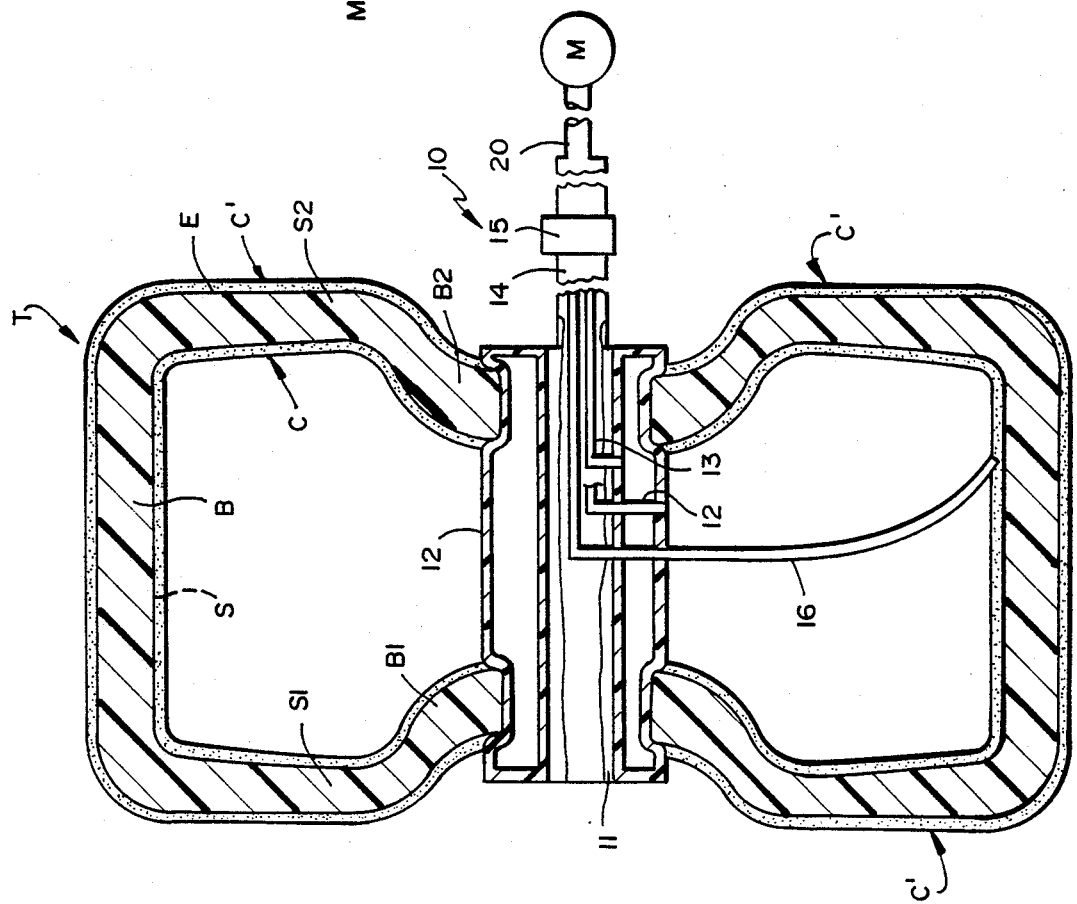
FIG. 6 is a fragmentary schematic view illustrating the tire after having been removed from the tank of FIG. 5 with the exterior coated with the coating material.

Before the tire T is removed from the expanded hub 12 (FIG. 4), the tire T is immersed, also during its 20 rpm rotation, in the tank V, as shown in FIG. 5. A pair of brushes 31, 32 have shafts 33, 34 arranged generally parallel to each other and are journalled for rotation in the tank V. As the brushes 31, 32 are rotated, preferably in opposition to the direction of rotation of the tire T, the exterior surface E of both sidewalls S1, S2 are thoroughly cleansed because of the detergent in and the temperature of the liquid admixture L. After approximately two or three rotations the tire T is removed from the tank V, and as illustrated in FIG. 6, the entire exterior surface E is coated with a coating C' of the liquid L. Thereafter, the motor M is deenergized, a pump P' connected to the flexible pipe 16 through the coupling 15 is energized, and the pump P' draws the excess liquid L from the tire interior I through the flexible pipe 16 and delivers the same through a flexible pipe 25 and a filter 26 into the tank V adjacent the bottom thereof. The liquid L is preferably drawn from adjacent a top of the tank V and returned adjacent the bottom of the tank V because debris removed from the exterior E of the tire T by the brushes 31, 32 tends to accumulate near the bottom of the tank V, and therefore cleaner liquid L is adjacent the top of the tank V.

Figure 7:
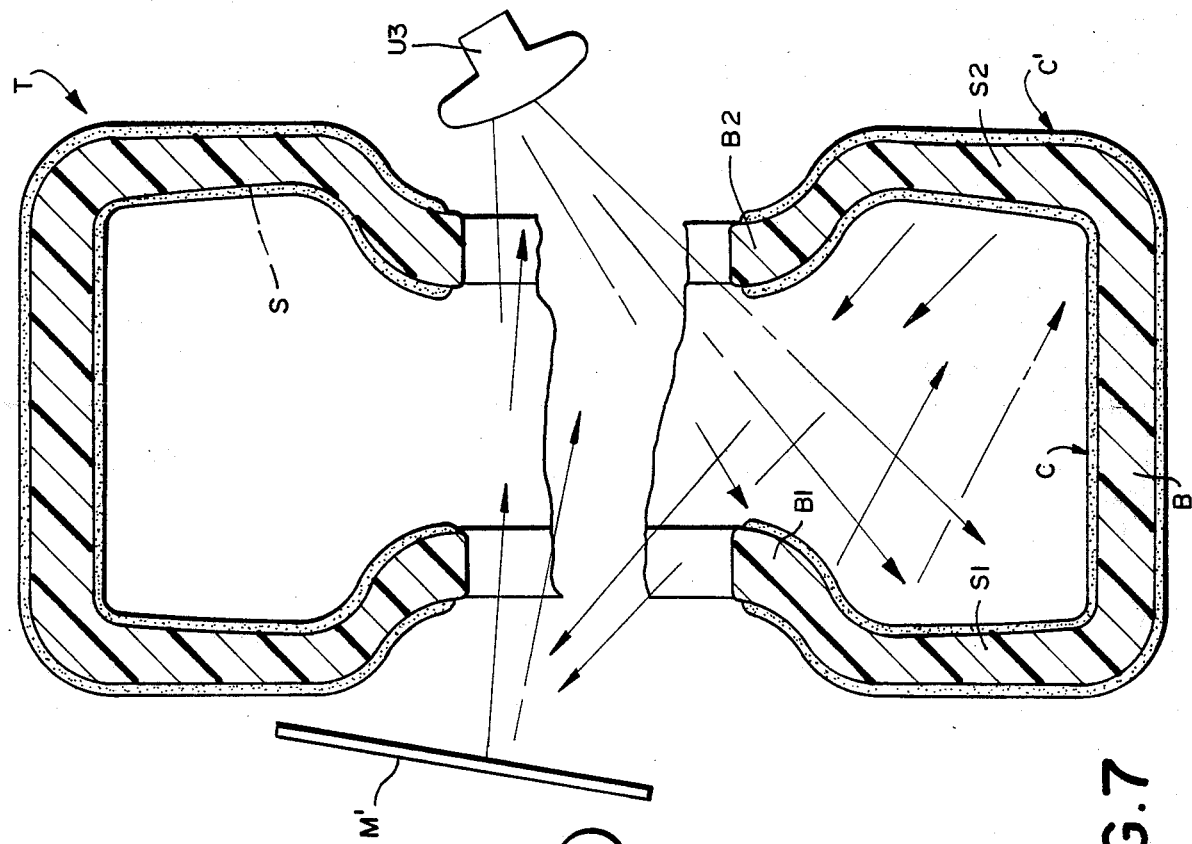
FIG. 7 is a fragmentary sectional view similar to FIG. 6 after the excess coating material has been removed from the tire interior, the tire has been removed from the expandable hub, and the tire exterior and interior can be spot-checked for relative large defects.

Approximately simultaneously with the removal of the excess liquid L from the tire interior I, the flexible pipe 13 and the flexible pipe 21 are vented to atmosphere resulting in the depressurization of the interior I and the collapse of the expandable hub 12 to its original FIG. 1 configuration which then allows the tire T to be removed and taken to a final inspection station (FIG. 7.)

At the final inspection station the tire T is mounted on a conventional spreader (not shown) and the beads are spread apart (also not shown) so that the rays from another ultraviolet light U3 can be directed into the tire interior from a side opposite a mirror M'. This constitutes a spot check of the tire interior surface S for relatively large defects such as patches and splices to make certain, for example, that a splice is not splitting. Such defects are not necessarily capable of being detected from the exterior in the manner diagrammatically illustrated in FIG. 4 if the patches are relatively sound and the splices are not split sufficiently to allow the interior coating C to migrate to the exterior surface E. However, a split splice is obviously a major defect, as might also a patch beginning to peel, and a quick inspection of such larger defects can be readily performed in a few seconds by a workman merely hand directing rays from the ultraviolet light U into the tire interior, looking toward the far sidewall S1 and bead B1, and looking in the mirror M' which is adjusted to direct light reflected from the inside surface of the near sidewall S2 and the adjacent bead B2 back toward the workman at the ultraviolet lamp side of the tire T. The tire T is, of course, rotated during this quick inspection by the conventional rotating mechanism of the conventional spreader machine, and in less than a minute a thorough quick inspection can be made of the tire interior for relatively large defects. At the same time the workman can direct the ultraviolet lamp U3 at the coating C' at both sidewalls S1, S2 and the tread B to determine if the exterior surface E has any large defects, such as bruises, slices, etc. Once the workman is assured that the tire T is in good condition for retreading, the tire T is removed from the spreader, retreaded, and the detergent cleansed exterior surface is then painted with conventional sidewall paint which bonds with an exceptionally high degree of adhesion to the coating C', particularly because of the cleansed exterior E of the tire T and the coating C' thereon.

The method described relative to FIGS. 1–7 can be varied while still including the major objectives and advantages of the present invention. For example, the flexible pipe 16 can be eliminated and a separate flexible pipe can simply be manually inserted by a workman into the interior I of the tire T and the exterior of the nonexpanded hub 12 (FIGS. 1 or 2) to inject the admixed liquid/coating material into the tire interior. Furthermore, after the expandable hub 12 has been exhausted to atmosphere at the end of the operation described relative to FIG. 6, the same flexible pipe can be manually inserted by the workman into the tire interior and directed toward the liquid L to remove through vacuum the excess accumulating therein leaving, of course, the coating C. Furthermore, separate air pipes unrelated to the rotatable coupling 15 o the tubular shaft 14 can be used to inflate and exhaust the expandable hub 12 and pressurize and depressurize the interior chamber I of the tire T, the latter being in lieu of the pressurization achieved by the pipe 21 of FIG. 4. These simply permit a less elaborate mechanism 10, and particularly the hub, anvil, rotating coupling, etc. to be utilized in the practice of the invention.

Figure 8:
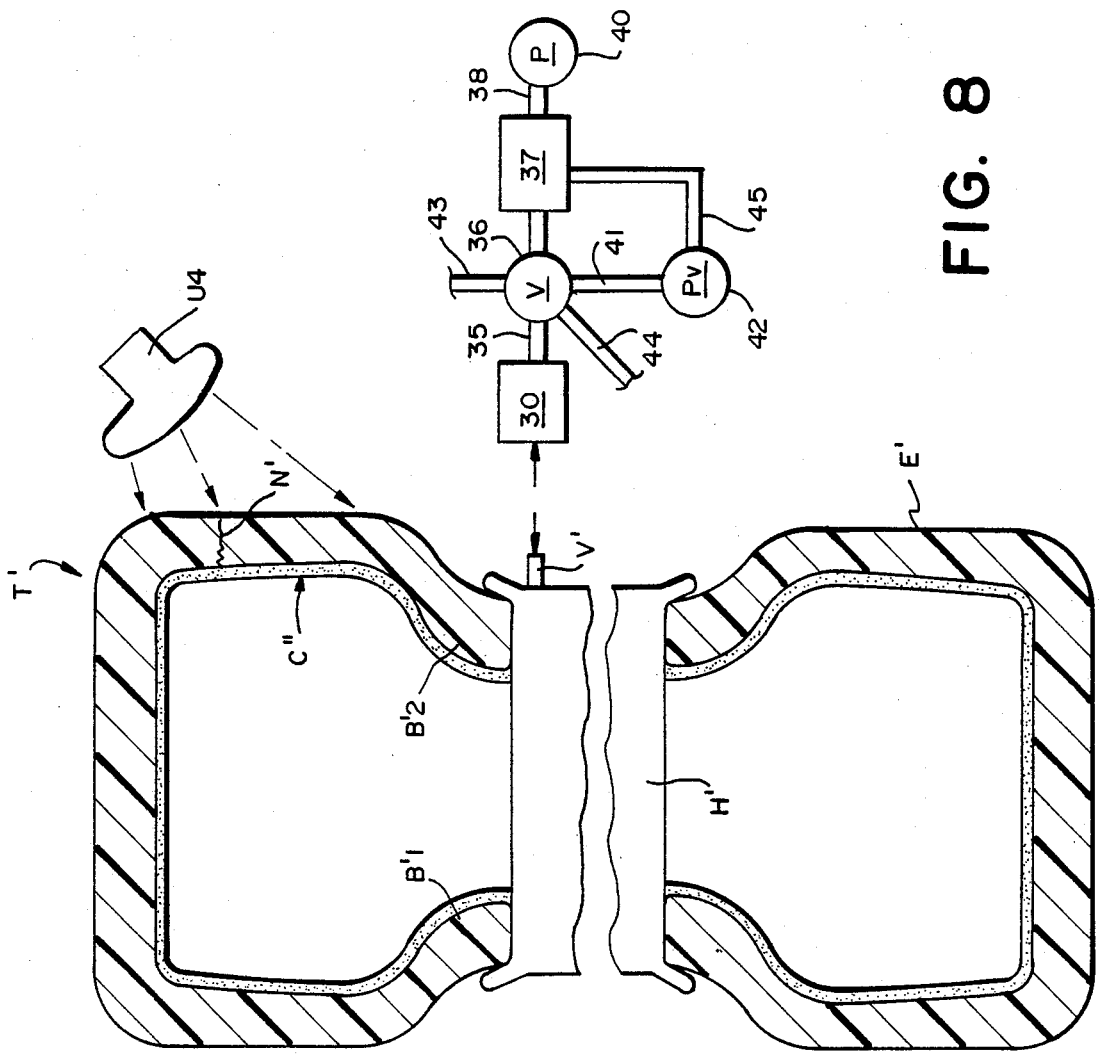
FIG. 8 is a fragmentary schematic view of a conventional tire mounted on a conventional rim having a conventional valve connected to a system for pumping coating material into the tire and removing the coating material out of the tire through the valve stem and externally inspecting the tire for coating material migration so that defects can be found and repaired without removing the tire from the rim.

Reference is now made to FIG. 8 of the drawings in which a conventional tire T' is seated with beads B1, B2' in conventional engagement with a conventional hub H' having a conventional valve stem V' and an associated valve (not shown) therein. A conventional valve or valve core extracting and inserting mechanism 30, which is manufactured by and available from the assignee of the instant application, is connected to the valve stem V' and when appropriately manually manipulated the valve within the valve stem V' can be removed and reinserted therefrom while at the same time maintaining a liquid tight connection between the valve stem V' and the valve core extracting and reinserting mechanism 30. The mechanism 30 is connected by a flexible line 35 having a valve 36 therein to a tank 37 pressurized from a line 38 by a pump 40. Another line 41 is connected between the valve 36 and the vacuum pump 42. The tank 37 contains the same admixed liquid L as heretofore described relative to FIGS. 2–7.

The system illustrated in FIG. 8 is particularly adapted for retail centers which repair tires, as opposed to retreading the same. In many cases minute pin hole, holes from thorns in small farm implement tires, etc. are not found or cannot be found with any degree of reliability by personnel at such tire centers, even upon removing the tires T' from the hubs H' and carefully manually visually inspecting the same for defects. However, in accordance with the present invention, the tire T' need not be removed from the rim or hub H', and instead the mechanism 30 is connected to the valve stem V' and actuated to extract the valve or valve core therefrom. If the tire T' is under pressure, the valve 36 can be manipulated to vent the air from the tire T' to atmosphere through a flexible pipe 43. Thereafter the valve 36 is again manipulated and the pump 40 is energized to deliver the liquid L from the tank 37 through the line 35, the valve 36 and the mechanism 30 into the interior of the tire T' through the valve stem V'. Depending upon the size of the tire T', appropriate instructions will be provided the workman so that sufficient admixed liquid L will be introduced into the interior of the tire T'. The tire T' can then be manually rotated by the workman which is facilitated by a rotary connection (not shown) between the mechanism 30 and the line 35. This manual rotation assures that the tire interior surface (unnumbered) of the tire T' is completely coated. The valve 36 is again operated to connect a line 44 to a source of pressurized air which is then delivered through the line 35 and the mechanism 30 into the tire interior pressurizing the same and causing a coating C" of the liquid admixture L to be forced through any defects, such as a thorn hole, N' to the tire exterior E' whereat it can be detected again as the entire tire T' is visually inspected in the manner heretofore described relative to FIG. 4 utilizing an ultraviolet lamp U4. The defect N' can be repaired (plugged), the valve 36 manipulated to connect the interior to a vacuum pump 42 via the line 41 to extract excess liquid L from the interior of the tire T' which is subsequently returned by a line 45 to the tank 37 after which the mechanism 30 is operated to reinsert the valve or valve core into the valve stem V'. Thus, tires T' which might otherwise be discarded can be readily repaired and the life thereof extended appreciably in a relatively straight-forward and simplified manner.

As was earlier noted, the liquid L is an admixture of a liquid detergent and a liquid which either brightens or fluorescence when subject to black light. Preferably the admixed liquid L is Tinopal SFP which is used in volume between 0–5% with a three component detergent formed of sodium methylicate (0–5% by volume), sodium tripoly phosphate (0–5% by volume) and sodium nitrate (0–5% by volume). Additionally, sodium benzoate (0–5% by volume) is used in the admixture as a rust inhibitor/anti-corrosive agent. The remainder of the admixture is, of course, water.

In further accordance with this invention, the method described relative to FIGS. 1 through 4 can be practiced in another manner to both inspect the tire interiors and apply so-called pressure seal or pressure sealant to the tire interior. For example truck fleets use tires which are internally sprayed with a latex resin sealant which will seal punctures, nail holes, etc. as these occur in transit. Accordingly, in keeping with the present invention such sealing compound or pressure sealant is admixed preferably with the Uvitex OB, the admixed liquid is then sprayed into the interior of the associated tire T as the tire is rotated, and a black light can then be used by shining the same into the interior causing the coating to fluoresce which will highlight existing defects, such as pin holes, nail holes, splice separations, etc. However, tires which have been so sprayed will subsequently be used, perhaps upwards to two or three years, removed from the rims, and then inspected prior to being recapped. Since the tires were sprayed earlier with the admixed pressure seal and Uvitex OB, it is only necessary to again subject the tire interior to the ultraviolet/black light and look into the interior to inspect the same for defects because, of course, the Uvitex OB will still fluoresce two or three years later. In this fashion even a new tire can be sprayed with an admixture of pressure seal and Uvitex OB, used in transit on highways for years, removed, inspected under ultraviolet light, and thereafter discarded or recapped, depending upon the status of the casing.

In keeping with the latter invention, the admixed liquid which is to be sprayed into the tire interior is preferably a pressure seal or pressure sealant composed of a latex resin which is approximately 30%–35% by volume of solids; 5%–15% of assorted solvents, such as glycols, alcohol, and glycol ethers, with the remainder being water with trace amounts of DOA (dioctyladipate), a plasticizer, to which is added 0–5% by volume of the Uvitex OB Thus, the total water by volume can be anywhere in the vicinity of approximately 50%–60%.

Obviously, while it is preferred to spray the pressure seal/Uvitex OB admixture into the interior of the tire as just described, in keeping with this invention the latter admixture can also be introduced into the tire as described relative to FIGS. 1 through 3, but thereafter ultraviolet light would be applied to the tire interior for inspection purposes, not to the exterior, as in conjunction with FIG. 4. Obviously, because of the nature of the pressure seal, the same can not migrate through small defects, and, therefore, this method can be utilized only for internal tire inspection of defects However, it should be appreciated that the pressure seal/Uvitex OB admixture can be sprayed into the tire T after the coating C has been applied thereto (FIG. 4) and before the tire T is dipped into the tank V (or not). In this fashion, the coating C would migrate through the tire T to the exterior E, as described earlier relative to FIG. 4 and, if desired, the tire T then could be removed from the mandrel 11 and the interior inspected for defects with, of course, the pressure seal/Uvitex OB admixture permitting inspection several years in the future and, of course, effecting self-sealing of porous liners or pin holes, etc.

In further accordance with this invention, it has been discovered that the coating material C which is applied to the tire interior I as a uniform coating C (see FIG. 4) will not migrate completely from the interior of the tire through the exterior thereof for a number of reasons, and thus will not be detected when the light from the ultraviolet lamps U1, U2 is directed against the exterior E of the tire T. For example, if the defect N in FIG. 4 were a very minute hole starting at the tire interior I but never reaching the exterior E, there would be no exterior defect N at the exterior surface E which was subject to detection because, quite obviously, the coating material L could not migrate to the surface E. Such a defect is indicated by reference numeral Na and this defect Na is illustrated inboard of the tread surface Tr of the tire T. The defect Na is also illustrated as spreading out through the rubber of the tire and/or the carcass thereof, as is diagrammatically indicated by the headed arrows associated with the defect Na. Typically, a defect Na of this type is created when the tire T is run for a considerable length of time on the highway under considerable high load and high speed conditions. The air inside the inflated tire constantly forces the air into a relatively initially small defect Na, increases the size thereof, and spreads this defect until such things as air pockets and/or bulges are created in the tire T. However, until the tire T bulges, there is no way of determining the existence of the defect Na, and should the tire T be retreaded after the old tread Tr is buffed or removed, the same defect Na would obviously be pre-existent in the new recapped or retreaded tire Thus when the newly recapped tire T with the defect Na therein is road-run for a considerable length of time, air will migrate between the old tire and the new tread and eventually separate the two, as is often evidenced by entire recaps or parts thereof being strewn along highways.

In accordance with another aspect of this invention, the tire T of FIG. 4 can be inspected as earlier described or instead, the tread Tr can be buffed or removed in a conventional fashion to the standard depth incident to a recapping operation. This normally is sufficient to expose the defect Na and any migration radially or circumferentially thereof, again as indicated by the unnumbered headed arrows Thus, after buffing and the attendant removal of the tread Tr, the ultraviolet lamps U1, U2 will fluoresce the now exposed coating C at the defect Na and, depending upon the extent of the defect, the tire can either be discarded or the defect repaired and the tire recapped Accordingly, defects which are not exposed at the tire exterior E, as in the case of the defect N of FIG. 4, will be exposed by the buffing-/removal of the tread Tr to expose the normally subsurface defects Na resulting in the eventual discard of the tire T or its repair and attendant effective and safe recapping thereof.

In further accordance with the present invention, the tire T could as well be a new tire which, if inspected, would clearly evidence the existence of the defect N but the defect Na since the tire tread Tr of a new tire would not be removed. Hence, if the coating C was simply highly migratory Tinopal SFP or Uvitex OB in the absence of a material which would seal defects, punctures, nail holes or the like, the defect N might be detected and repaired, but the defect Na would not be detected and might eventually expand as noted earlier herein under road-running conditions eventually migrating through the tire T and the exterior tread Tr causing tire failure, an air pocket, bulging, a blow-out or the like. Accordingly, particularly in the case of new tires, the purely migratory coating C absent material which will stop and seal a nail hole, for example, is removed by an appropriate solvent from the interior of the tire T after the inspection described relative to FIG. 4 has been completed. Thereafter the same mechanism 10 can be utilized to coat the tire interior with an admixture of Tinopal SFP or Uvitex OB, preferably the former, and material which will enter and seal relatively large defects, such as nail holes. Such a sealing material is manufactured by the assignee and sold under the trademark STS, and this tire sealant formulation is volumetrically 72% water, 24.30% ethylene glycol, 2.10% cellulosic fibers, 0.90% thickener, and 0.70% rust inhibitors. Approximately up to 20% Tinopal SFP by volume is mixed with the latter-defined tire sealant formulation in a proportional volume to achieve 100% of the admixed coating. In other words, irrespective of the percentage of Tinopal SFP up to 20% of the total, the remainder relative to 100% total is tire sealant The preferred range of Tinopal SFP is 0-5% with up to 2% of Tinopal SFP being effective in the admixture to seal nail holes or the like as they occur and effect sufficient migration and attendant subsequent fluorescence to detect such sealed nail holes upon the subsequent buffing of the tire and the removal of the tread Tr heretofore described. Thus, in keeping with this aspect of the invention one might not even inspect the interior of the tire nor coat it with the coating C of FIG. 4, but would instead apply, for example, an admixture of 1% Tinopal SFP and 99% tire sealant formulation to the tire interior, run the tire under normal highway conditions, and if a nail hole was eventually sealed by the admixture, the eventual removal of the tread Tr incident to recapping would evidence the now sealed defect when subjected to the ultraviolet light of the ultraviolet lamps U1, U2. Thus, in this manner one would not only detect defects incident to a recapping operation, but defects would be sealed during the lifetime use of the tire and yet would be detectable upon subsequent tread buffing.

It is also quite possible that the defects N and Na would be detectable at the tread surface Tr even absent buffing, although most tires are extremely dirty and this might not occur unless the tires were totally cleansed However, the invention further contemplates the inspection of the tread surface Tr prior to buffing preceded by thorough, cleansing, be it through liquid chemical detergents or otherwise, followed by subsequent buffing and ultraviolet inspection. This double ultraviolet inspection prior to buffing with or without cleansing and following buffing most asssuredly will result in 100% efficient detection of defects N and/or Na.

Although a preferred embodiment of the invention has been specifically illustrated and described herein, it is to be understood that minor variations may be made in the apparatus without departing from the spirit and scope of the invention, as defined in the appended claims.

I claim:

1. A method of inspecting a tire for defects comprising the steps of applying a coating of material which accentuates defects when influenced by predetermined electromagnetic wavelengths to an interior surface of a tire, buffing an exterior tread surface of the tire, and applying the predetermined electromagnetic wavelengths to the buffed exterior tread surface of the coated tire whereby coating material which has migrated through a defect in the tire is accentuated and thereby readily detected.

2. The method as defined in claim 1 wherein the predetermined electromagnetic wavelengths are in the ultraviolet range and the material becomes brightened/fluorescent.

3. The method as defined in claim 1 including the step of rotating the tire incident to performing the material applying step to effect relatively complete coating of the tire interior surface.

4. The method as defined in claim 1 including the step of recapping the tire.

5. The method as defined in claim 4 wherein the predetermined electromagnetic wavelengths are in the ultraviolet range and the material becomes brightened/fluorescent.

6. The method as defined in claim 4 including the step of rotating the tire incident to performing the material applying step to effect relatively complete coating of the tire interior surface.

7. The method as defined in claim 4 including the step of repairing the detected defect.

8. The method as defined in claim 4 wherein the coating material is an admixture and includes as a part thereof a tire sealant which will seal the tire defects during migration therethrough.

9. The method as defined in claim 8 wherein the buffing step is performed to remove sufficient exterior tread to expose defects which have not penetrated from the tire interior through the unbuffed exterior tread surface.

10. The method as defined in claim 8 wherein the tire is road-run after the coating applying step and the buffing step is performed upon the road-run tire.

11. The method as defined in claim 8 wherein the tire is road-run after the coating applying step thereby distributing the coating material over the entire tire interior surface.

12. The method as defined in claim 4 wherein the coating material is an admixture and includes as a part thereof a tire sealant which will seal the tire defects during migration therethrough, and said admixture includes defect accentuating coating material in the range of up to 20% and tire sealant in the range of up to approximately 99%.

13. The method as defined in claim 4 wherein the coating material is an admixture and includes as a part thereof a tire sealant which will seal the tire defects during migration therethrough, said admixture includes defect accentuating coating material in the range of up to 20%, tire sealant in the range of up to approximately 99%, and said tire sealant includes cellulosic fibers.

14. The method as defined in claim 4 wherein the buffing step is performed to remove sufficient exterior tread to expose defects which have not penetrated from the tire interior through the unbuffed exterior tread surface.

15. The method as defined in claim 4 wherein the tire is road-run after the coating applying step and the buffing step is performed upon the road-run tire.

16. The method as defined in claim 4 wherein the tire is road-run after the coating applying step thereby distributing the coating material over the entire tire interior surface.

17. The method as defined in claim 1 including the step of repairing the detected defect.

18. The method as defined in claim 1 including the step of repairing the detected defect, and recapping the repaired tire.

19. The method as defined in claim 1 wherein the coating material is an admixture and includes as a part thereof a tire sealant which will seal the tire defects during migration therethrough.

20. The method as defined in claim 1 wherein the coating material is an admixture and includes as a part thereof a tire sealant which will seal the tire defects during migration therethrough, and said admixture includes defect accentuating coating material in the range of up to 20% and tire sealant in the range of up to approximately 99%.

21. The method as defined in claim 1 wherein the coating material is an admixture and includes as a part thereof a tire sealant which will seal the tire defects during migration therethrough, said admixture includes defect accentuating coating material in the range of up to 20%, tire sealant in the range of up to approximately 99%, and said tire sealant includes cellulosic fibers.

22. The method as defined in claim 1 wherein the buffing step is performed to remove sufficient exterior tread to expose defects which have not penetrated from the tire interior through the unbuffed exterior tread surface.

23. The method as defined in claim 1 wherein the tire is road-run after the coating applying step and the buffing step is performed upon the road-run tire.

24. The method as defined in claim 1 wherein the tire is road-run after the coating applying step thereby distributing the coating material over the entire tire interior surface.

25. A method of inspecting a tire for defects comprising the steps of applying a first coating material which accentuates defects under ultraviolet light to an interior surface of a tire, applying ultraviolet light to an exterior surface of the coated tire whereby coating material which has migrated through a defect in the tire to the exterior is accentuated and thereby readily detected, applying a second coating material which is an admixture of a material which accentuates defects when influenced by predetermined electromagnetic wavelengths and a tire sealant which will seal the tire defects during migration therethrough to the interior surface of the tire, buffing the exterior tread surface of the tire, and applying the predetermined electromagnetic wavelengths to the buffed exterior tread surface of the coated tire whereby the defect accentuation material of the second coating which has migrated through a defect in the tire is accentuated and thereby readily detected.

26. The method as defined in claim 25 including the step of recapping the tire.

27. The method as defined in claim 26 wherein the buffing step is performed to remove sufficient exterior tread to expose defects which have not penetrated from the tire interior through the unbuffed exterior tread surface.

28. The method as defined in claim 26 wherein the tire is road-run after the coating applying step and the buffing step is performed upon the road-run tire.

29. The method as defined in claim 26 wherein the tire is road-run after the coating applying step thereby distributing the coating material over the entire tire interior surface.

30. The method as defined in claim 25 including the step of repairing the detected defect.

31. The method as defined in claim 25 including the step of repairing the detected defect, and recapping the repaired tire.

32. The method as defined in claim 25 wherein the buffing step is performed to remove sufficient exterior tread to expose defects which have not penetrated from the tire interior through the unbuffed exterior tread surface.

33. The method as defined in claim 25 wherein the tire is road-run after the coating applying step and the buffing step is performed upon the road-run tire.

34. The method as defined in claim 25 wherein the tire is road-run after the coating applying step thereby distributing the coating material over the entire tire interior surface.

* * * * *